United States Patent [19]

Lessing

[11] Patent Number: 4,972,073
[45] Date of Patent: Nov. 20, 1990

[54] LIGHT WAVE CONDUCTOR-BENDING SENSOR WITH SLIDING RAILS FOR MONITORING BRIDGE STRUCTURES OR THE LIKE

[75] Inventor: Rainer Lessing, Reichshof, Fed. Rep. of Germany

[73] Assignee: Felten & Guilleaume Energietechnik AG, Cologne, Fed. Rep. of Germany

[21] Appl. No.: 468,563

[22] Filed: Jan. 23, 1990

[30] Foreign Application Priority Data

Feb. 2, 1989 [DE] Fed. Rep. of Germany ....... 3902997

[51] Int. Cl.$^5$ .......................... H01J 5/16; G01L 1/24; G02B 6/02
[52] U.S. Cl. ................................ 250/227.16; 73/800; 350/96.15; 350/96.29
[58] Field of Search ....................... 250/227.14, 227.15, 250/227.16, 227.17, 227.18, 231.10, 231.19, 239; 73/800, 786; 350/96.15, 96.29

[56] References Cited

U.S. PATENT DOCUMENTS

| | | | |
|---|---|---|---|
| 4,477,725 | 10/1984 | Asawa et al. | 250/227.16 |
| 4,618,764 | 10/1986 | Harmer | 250/227.14 |
| 4,634,217 | 1/1987 | Levacher et al. | 250/227.16 |
| 4,636,638 | 1/1987 | Huang et al. | 250/227.15 |
| 4,671,659 | 6/1987 | Rempt et al. | 73/800 |
| 4,751,690 | 6/1988 | Krueger | 73/800 |
| 4,860,586 | 8/1989 | Miers et al. | 250/227.16 |
| 4,880,970 | 11/1989 | Jones | 250/227.16 |
| 4,918,305 | 4/1990 | Wlodarczyk et al. | 250/227.14 |

FOREIGN PATENT DOCUMENTS 1601341 10/1981 United Kingdom ................. 73/786

Primary Examiner—David C. Nelms
Assistant Examiner—Michael Messinger
Attorney, Agent, or Firm—Michael J. Striker

[57] ABSTRACT

A measuring device with a light wave conductor-bending sensor for monitoring bridge structures comprises a light emitter and a light receiver, a multi-mode light wave conductor arranged to extend along a structural part and having two ends connected with the light emitter and the light receiver, respectively, an elongated plate having a lower side arranged to be placed on and connected with the structural part and also having an upper side provided with a longitudinal groove, two sliding rails arranged in the longitudinal groove and having outer ends fixed to the plate and inner ends spaced from one another to form an intermediate space and movable relative to the plate. The light wave conductor is fixed with one of the sliding rails, then extends through the intermediate space and forms a freely movable curve, and then exztends along and is fixed to the other of the movable rails.

19 Claims, 2 Drawing Sheets

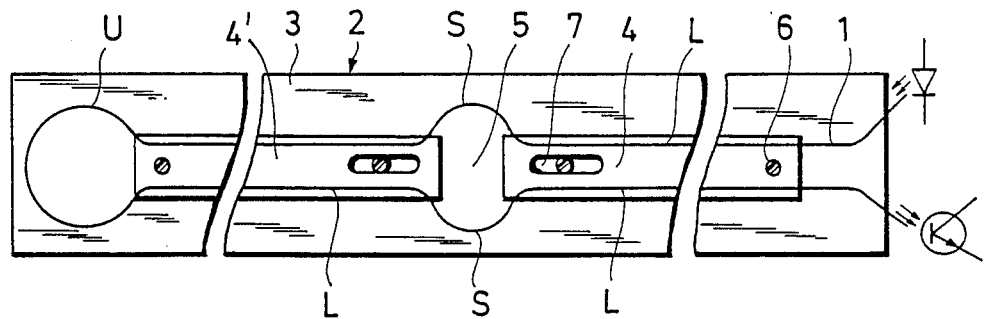
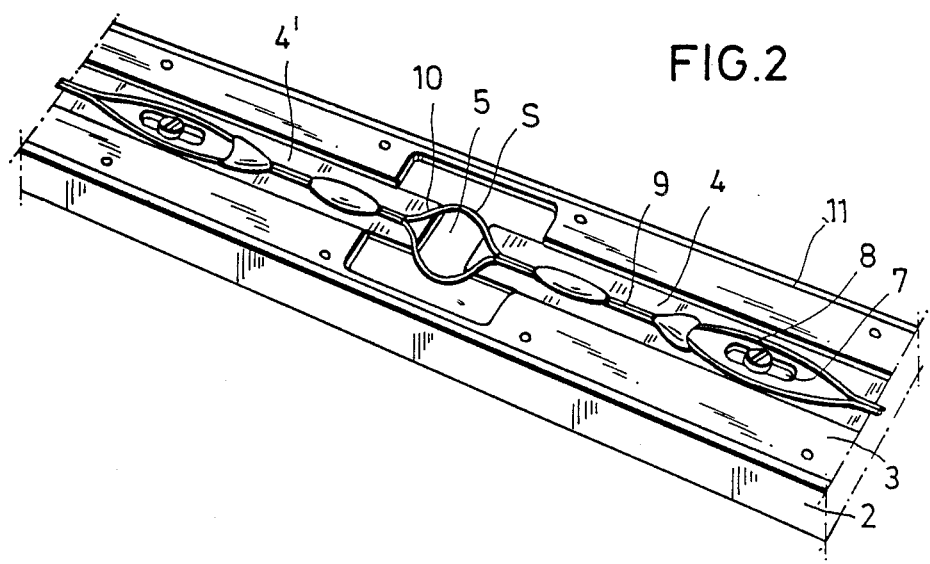

LIGHT WAVE CONDUCTOR-BENDING SENSOR WITH SLIDING RAILS FOR MONITORING BRIDGE STRUCTURES OR THE LIKE

BACKGROUND OF THE INVENTION

The present invention relates to a measuring device with a light wave conductor-bending sensor for monitoring bridge structures.

More particularly, it relates to such a measuring device in which a multi-mode light wave conductor extends along the structural part in a meander-like manner, or in other words, with at least one strong curvature and connected at both ends with a light emitter and light receiver. It is also suitable for monitoring other structural parts and structural assemblies as to their expansion (pulling, pressing, bending) and breakage (fissures or gaps), especially in the case of engineering structures such as arches, dams or masonry dams and in the case of historic structures.

One of such devices is disclosed in the German document DE-PS 3,015,391, in which several methods are provided for controlling physical load values to be monitored and/or in a structural part. It is also proposed that the light conductor can be arranged in the structural part or the light conducting fibers can be arranged in their envelopes in meander-like, wave-like or coil-like manner. It should be mentioned with respect to this arrangement that it serves for monitoring high deformations. The dependence upon the light damping of a light wave conductor from changing bending radii of the light wave conductor can be desired for producing an extraordinarily sensitive expansion or bending sensors for monitoring of structural parts.

SUMMARY OF THE INVENTION

Accordingly, it is an object of the present invention to provide a measuring device with a light wave conductor-bending sensor which improves the existing devices.

More particularly, it is an object of the present invention to provide a measuring device of the above mentioned general type which is formed so that the meander-like light wave conductor can be arranged on the expansion point to be measured, especially on a bridge structural part so that during expansion a change of the bending radius and therefore light damping is performed.

In keeping with these objects and with others which will become apparent hereinafter, one feature of the present invention resides, briefly stated, in a measuring device in which the light wave conductor is mounted on an elongated plate whose lower side is placed on a structural part, and the upper surface of the plate is provided with a longitudinal groove accommodating two sliding rails with an intermediate space in the center of the plate so that each rail is fixed with the plate at its outer end and is longitudinally movable at its inner end, and the light wave conductor is fixed with the sliding rails but arranged movably in a free curve in the intermediate space between the inner ends of the sliding rails.

When the measuring device is designed in accordance with the present invention, it achieves the above specified objects.

In accordance with another feature of the present invention, the sensitivity of the sensor can be doubled in that one portion of the light wave conductor extends at one side of the longitudinal axis of the plate, the other portion of the light wave conductor extends at the other side of the longitudinal axis of the plate, and a loop connects the above mentioned both portions. In such a measuring device two curves which operate as sensors are provided. Moreover, the light wave conductor connections for the emitter and the receiver lie near one another.

The measuring device in accordance with the present invention is designed so that it is very simple and at the same time provides for a highly sensitive light wave conductor-bending sensor for monitoring bridge structures.

In accordance with a further feature of the present invention, the light wave conductor has a hard secondary coating and in the outer region of each sliding rail is coated with a polyvinylchloride hose, in the inner region of each sliding rail is coated by a steel pipe, and in the region of the free curve is coated with a silicon hose.

Still a further feature of the present invention is that the upper side of the plate has a raised edge with a groove for a silicon seal, a plate-shaped cover is mounted on the plate, and a square housing for the emitter and receiver is screwed on the connecting end, wherein the light wave conductor extends through a hole in the plate.

In addition to the above mentioned light wave conductor which is a sensor light wave conductor, an identical reference light wave conductor can be provided in the device. The housing for the emitter and receiver can accommodate a housing for an emitting diode for both light wave conductors, and housings for each photodiode with integrated amplifier.

The plate, the cover and the housings can be composed of aluminum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of an expansion-bending sensor with two light wave conductor-sensor curves in the center and with emitter/receiver connecting chamber at the right hand side;

FIG. 2 is a perspective view of a central part of the measuring device in accordance with the present invention;

DESCRIPTION OF THE PREFERRED EMBODIMENTS

Figure 3:
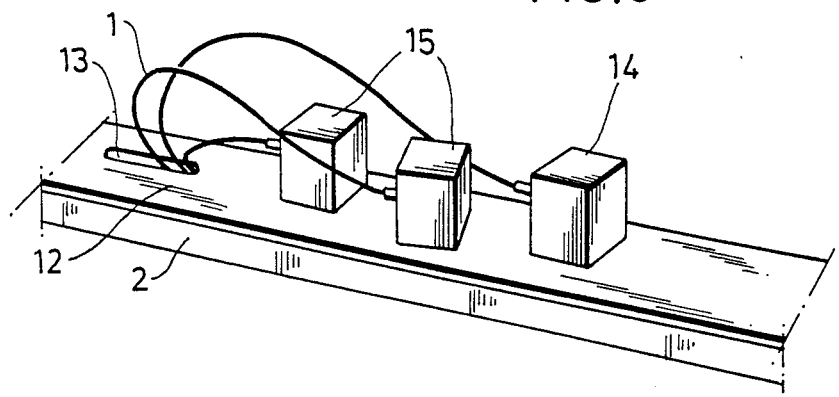
FIG. 3 is a view showing a connecting end of the measuring device in accordance with the present invention with a plate, a cover and emitter/receiver housing.

FIG. 1 shows in principle a light wave conductor 1 which is applied on an elongated plate 2 composed of a same material as a structural element, for example aluminum. The plate has a plain lower side which is glued on the structural part by a construction glue, such as for example a glue known under the commercial name Gupalon.

The plate has an upper side 3 provided with a groove extending along the longitudinal axis. Sliding rails 4 and 4' are arranged in the groove. Each of the sliding rails occupies approximately one-third of the plate width and one-third of the plate length. The sliding rails are arranged with an intermediate space 5 in the center of the plate and with a free space at each plate end. The intermediate space 5 serves as a sensor chamber. Each sliding rail 4 and 4' is firmly connected with the plate 2 at its outer end by a screw 6. At its inner end, each sliding rail is movably connected with the plate 2 via a longitudinal hole 7 and a guiding pin so as to move along the longitudinal axis of the plane.

The light wave conductor 1 is guided from one plate end to the other plate end in the following manner: it is firmly glued along one sliding rail 4, runs in the intermediate space 5 in an arc freely movable relative to the other rail, and then again firmly glued along the other rail 4'. The fixed light wave conductor portions L on the rails serve for the optical conductivity and are not as essential for the invention as the freely movable light wave conductor curves S which form a sensor portion.

The above described sensor device will of course operate with only one sliding rail and the light wave conductor curve on the movable end of the rail, but in a less advantageous manner. The sensitivity of the sensor is however doubled when as shown in FIG. 1, the light wave conductor 1 extends at one side of the longitudinal axis of the plate from one plate end (the connection space) to the other plate end (the deviation space) then is deviated to form a loop U, and then extends at the opposite side of the longitudinal axis of the plate in a mirror-symmetrical manner. Thereby two light wave conductor curves S are formed as sensors.

The bending radius of the deviating loop U of the light wave conductor must not be smaller than 10 mm, since otherwise the ground damping would be so high that the sensor effect would be exceeded. The deviating chamber provides for a sufficient space.

For bending measurement on a bridge, the sensor device (the lower side of the plate 2) is glued in the region of the girder. The bending to be measured is first converted in a respective expansion and transferred to the plate. There it is converted by means of the sliding rails into a proportional bending radius change of the light wave conductor and thereby the light damping is produced which is a measure for the expansion or bending of the bridge. The light damping is an inversely proportional measuring value for the distance between both sliding rails from one another. The measuring sensitivity can be varied depending on the initial bending radius of the light wave conductor and the distance between the rails within wide limits, with high sensitivity in the case of stronger curving and smaller distance.

FIG. 2 shows the details of the practical construction of the measuring device. The light wave conductor 1 which is coated by a hard, secondary coating, is surrounded on each sliding rail 4 and 4' in an outer region by a polyvinylchloride hose 8 and in the region of the inner rail end by a steel pipe 9 with a thickness of approximately 0.6 mm. Both are mounted on the rail by a construction glue. The hose serves for protecting the conductive portion L of the light wave conductor, while the guidance in the steel pipes provides for the positive bending of the sensor portion S of the light wave conductor. The freely movable curve C of the light wave conductor is surrounded by a silicon hose 10, which substantially imparts the mechanical stability of the sensor.

The sensor housing is formed of two shells. The upper side 3 of the plate 2 has a raised edge with a circular groove for a silicon seal 11 for moisture sealing. A corresponding plate-shaped cover 12 is placed on it and screwed with the plate as shown in FIG. 3. In the region of the connecting end, a parallelepiped-shaped housing 6 shown in FIG. 4 for an emitter 14 and a receiver 15 is screwed on it. The light wave conductor 1 is guided from the emitter and receiver to an opening 13 in the connecting chamber of the plate. This construction not only facilitates the mounting of the sensor on the loaded structural parts, but also provides for the access to the individual sensor parts after the mounting.

Figure 4:
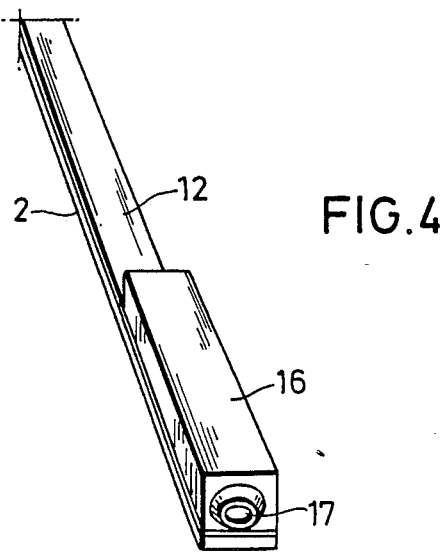
FIG. 4 is a view showing an emitter/receiver housing which accommodates the individual housings.

As further shown in FIGS. 3 and 4, a reference light wave conductor which is similar to the sensor light wave conductor 1 is guided from the light emitter to the light receiver. The emitter/receiver housing 16 accommodates the following elements: the housing 13 for the emitter diode with coupling in both light wave conductors, and both housings 15 each for a silicium-photodiode with integrated amplifier. A water-tight six-pole bush 17 for the electrical conductance to the measuring chamber for supply voltage and measuring signals is arranged in the outer end surface of the housing.

The light emitter can be formed by IR-LED with a small angle of refraction. For increasing the light efficiency, it is grinded to the vicinity of the target and subsequently again clear-polished. The light of the LED ($\lambda=850$ nm) is introduced into the two identical light wave conductors, namely the sensor light wave conductor and the reference light wave conductor, for monitoring the emitting power of the LED. Since it is presumed that both the receiver diodes which are taken from the same charge also have same aging properties, this construction is justified without radiation divider. The used silicium for the diodes with integrated amplifier are selected with respect to their temperature conditions in pairs. The mounting of the diodes is not critical. The emitting diodes have a sufficiently high angle of reflection to supply sufficient light into both light wave conductors. The receiving diodes have a receiving surface of 4 mm$^2$, which in all norms makes simple the light wave conductor adjustment before the surface.

It will be understood that each of the elements described above, or two or more together, may also find a useful application in other types of constructions differing from the types described above.

While the invention has been illustrated and described as embodied in a measuring device with a light wave conductor-bending sensor for monitoring bridge structures or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A measuring device with a light wave conductor bending sensor for monitoring bridge structures, comprising a light emitter and a light receiver; a multi-mode light wave conductor arranged to extend along a structural part and having two ends connected with said light emitter and said light receiver, respectively; an elongated plate having a lower side arranged to be placed on and connected with the structural part and also having an upper side provided with a longitudinal groove; two sliding rails arranged in said longitudinal groove and having outer ends fixed to said plate and inner ends spaced from one another to form an intermediate space and movable relative to said plate, said light wave conductor being fixed with one of said sliding rails, then extends through said intermediate space and forms a freely movable curve, and then extends along and is fixed to the other of said movable rails.

2. A measuring device as defined in claim 1, wherein said plate is composed of a material which is the same as that of the structural part.

3. A measuring device as defined in claim 1, wherein said plate is composed of a material which is similar to that of said structural part.

4. A measuring device as defined in claim 1, wherein said lower side of said plate is flat.

5. A measuring device as defined in claim 1, wherein each of said sliding rails has a width equal to substantially one-third of a width of said plate and a length equal to substantially one-third of a length of said plate.

6. A measuring device as defined in claim 1, 2 wherein said sliding rails are arranged so that a free space is provided at each end of said plate.

7. A measuring device as defined in claim 1; and further comprising means for connecting said plate with the structural part and including gluing means.

8. A measuring device as defined in claim 1; and further comprising means for fixing said light wave conductor to said sliding rails and including gluing means.

9. A measuring device as defined in claim 1, wherein said plate has a longitudinal axis, said light wave conductor having a first portion located at one side of said longitudinal axis, a second portion located at the other side of said longitudinal axis, and a loop connecting said portions with one another, said portions being mirror-symmetrical relative to one another.

10. A measuring device as defined in claim 1, wherein each of said sliding rails has an outer region and an inner region, said light wave conductor being surrounded in said outer region with a polyvinylchloride hose and being surrounded in said inner region by a steel pipe, said hose and said pipe being connected with said rails, said light wave conductor being surrounded by a silicon hose in the region of said curve.

11. A measuring device as defined in claim 10, wherein said light wave conductor is surrounded by a hard secondary coating.

12. A measuring device as defined in claim 10, wherein said steel pipe has a thickness of substantially 0.6 mm.

13. A measuring device as defined in claim 1, wherein said plate has a raised edge provided with a groove; and further comprising a seal arranged in said groove; a plate-shaped cover mounted on said plate; and a housing for said emitter and said receiver mounted on said plate, said plate having a hole through which said light wave conductor extends.

14. A measuring device as defined in claim 13; and further comprising means for mounting said cover and said housing on said plate and including screw means.

15. A measuring device as defined in claim 13, wherein said seal is formed as a silicon sealing member.

16. A measuring device as defined in claim 13, wherein said light wave conductor is a sensor light wave conductor; and further comprising a reference light wave conductor which is identical to said sensor light wave conductor.

17. A measuring device as defined in claim 16, wherein said emitter includes an emitting diode for both said light wave conductors, said receiver including two photodiodes with integrated amplifiers for said light wave conductors, said housing accommodating a first housing for said emitting diode and second housings for said photodiodes.

18. A measuring device as defined in claim 16, wherein said housing has an end surface provided with a plug bush for an electrical conduit.

19. A measuring device as defined in claim 13, wherein said plate, said cover and said housing are composed of aluminum.

* * * * *